United States Patent [19]
Schneider et al.

[11] Patent Number: 6,030,118
[45] Date of Patent: Feb. 29, 2000

[54] TEMPERATURE INDICATOR FOR REFRIGERATED PRODUCTS OR THE LIKE

[75] Inventors: Norbert Schneider, Altrip; Günther Bettinger, Schifferstadt; Ronald Veitch, Maxdorf, all of Germany

[73] Assignee: EMTEC Magnetics GmbH, Ludwigshafen, Germany

[21] Appl. No.: 08/973,839

[22] PCT Filed: Jun. 20, 1996

[86] PCT No.: PCT/EP96/02677

§ 371 Date: Dec. 17, 1997

§ 102(e) Date: Dec. 17, 1997

[87] PCT Pub. No.: WO97/03341

PCT Pub. Date: Jan. 30, 1997

[30] Foreign Application Priority Data

Jun. 30, 1995 [DE] Germany ............... 195 24 007

[51] Int. Cl.[7] ............... G01K 11/06; G01D 5/12
[52] U.S. Cl. ............... 374/160; 116/204
[58] Field of Search ............... 374/159–160, 374/161, 162, 163; 116/204, 217

[56] References Cited

U.S. PATENT DOCUMENTS

| | | | |
|---|---|---|---|
| 3,675,501 | 7/1972 | De Kanter | 73/358 |
| 3,915,006 | 10/1975 | Ayres | 73/371 |
| 4,576,781 | 3/1986 | Duncombe et al. | 376/247 |
| 4,850,716 | 7/1989 | Baker et al. | 374/160 |
| 4,993,843 | 2/1991 | Toupin et al. | 374/160 |
| 5,490,476 | 2/1996 | Veitch et al. | 116/217 |

FOREIGN PATENT DOCUMENTS

| | | |
|---|---|---|
| 2 640 750 | 6/1990 | France . |
| 87/07373 | 12/1987 | WIPO . |

*Primary Examiner*—Vit Miska
*Attorney, Agent, or Firm*—Keil & Weinkauf

[57] ABSTRACT

An apparatus for irreversibly indicating that the permissible temperature of stored products has been temporarily exceeded is described, in which a container has a heat-conducting connection to the product to be monitored and contains, in its interior, a medium having a melting point which is just above the permissible storage temperature, magnetizable particles being suspended in the medium. Moreover, solid magnetizable bodies are uniformly distributed in the container. After the deep-freezing process is complete, the magnetizable particles and the solid bodies are magnetized. If the permissible storage temperature is exceeded, the suspension becomes liquid and the pigments accumulate on the solid bodies, an optical indicator present on a wall of the container and visible from the outside detecting that the permissible temperature has been exceeded.

22 Claims, 7 Drawing Sheets

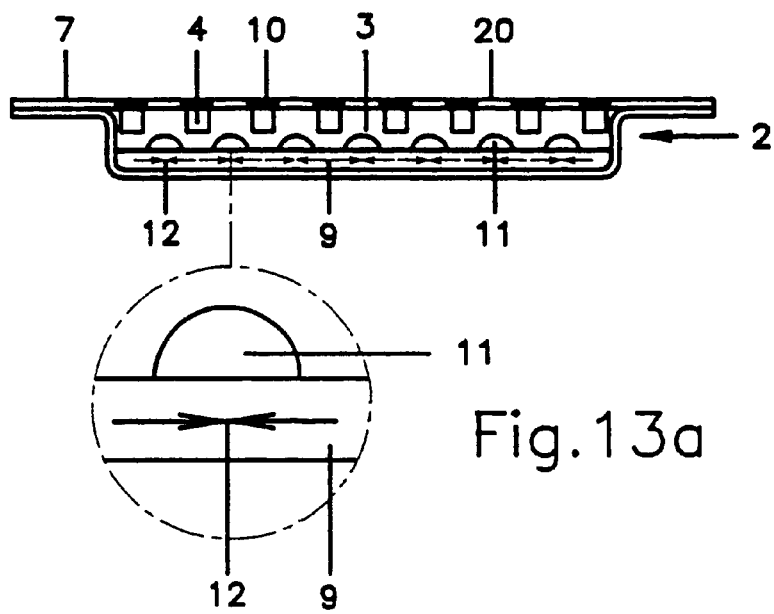
FIG. 13
Fig. 13a
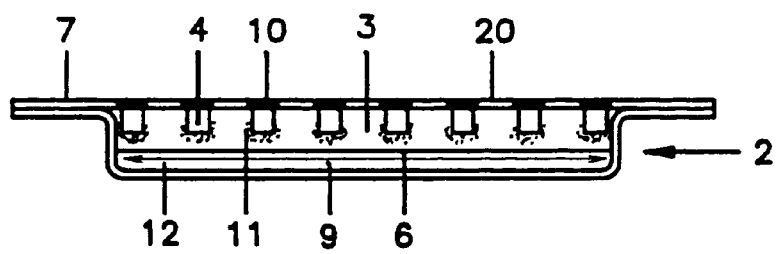
Fig. 14
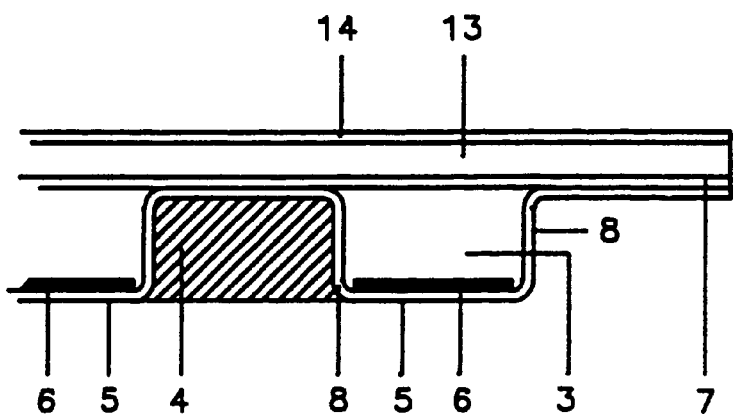
Fig. 15

18(a)

18(b)

18(c)

18(d)

TEMPERATURE INDICATOR FOR REFRIGERATED PRODUCTS OR THE LIKE

The present invention relates to an apparatus for irreversibly indicating that the permissible temperature of goods, rooms or the like has been temporarily exceeded, consisting of a container which has a heat-conducting connection to the goods or to the surrounding room and which contains, in its interior, a suspension consisting of a medium having a melting point or softening range which is in the range of the control temperature and magnetizable particles suspended in the medium. The present invention furthermore relates to a process for temperature monitoring with the corresponding apparatus and a process for the production of the apparatus.

Apparatuses or processes of the generic type defined at the outset are described in U.S. Pat. No. 3,675,501 and DE-A 42 10 739 of the same applicant.

In deep-freeze storage of certain foods, a storage temperature of at least −18° C. must be maintained if a relatively long shelf life is to be ensured, although said storage temperature may be briefly exceeded. If a temperature of from −10 to −15° C. is exceeded, the shelf life of many foods is no longer ensured; the frozen material is considered to have started to thaw although it still appears frozen on the outside. Temperature monitoring is subject to, inter alia, EC Directives 89/108 and 98/108.

A similar situation applies to the storage of prepared food, for which a temperature of a few degrees above zero degrees Celsius is generally prescribed, to blood plasmas or to other articles for which there is a prescribed maximum acceptable storage temperature.

There is also a need to monitor the ambient temperature or the temperature of closed spaces and the like and irreversibly to register impermissible deviations.

Usually, freezers are equipped with built-in thermometers which indicate the temperature in a certain part of the freezing space, or a conventional thermometer is placed on or next to the frozen material and is removed from the freezer for readings. In these cases, there is no guarantee that the temperature of the frozen material will be measured exactly. Moreover, air convection in the freezing space may be hindered by stacking and packing of the frozen material, so that the minimum temperatures required for ensuring the shelf life of the foods may be exceeded in certain parts of the freezing space, even when the equipment functions satisfactorily. The user of the frozen material cannot detect the fact that the maximum storage temperature has been exceeded, so that he cannot counteract spoilage of the food by removing it in good time and using it immediately. The danger that deep-frozen food will start to thaw without this being noticed is particularly great, for example, when a relatively large amount of material to be chilled is introduced in a warm state into the freezer. It is therefore desirable to have a temperature indicator which shows, for every food bag or group of bags, whether they have always been sufficiently chilled during their storage time.

The abovementioned U.S. Pat. No. 3,675,501 describes a kind of fever thermometer, consisting of various closed containers which contain, in the temperature-relevant range, media, such as waxes or fatty acids, in which magnetic particles, such as barium Lerrite, are suspended. A magnetic film which is present at the instant of the phase transition from liquid to solid and effects orientation of the magnetic pigments is drawn over this arrangement. The film is then removed and the container is then administered to the patient; after removal, it is possible to determine the container in which the frozen magnetic order has broken down, this being taken as a measure of the temperature. DE-A 42 10 739, which is likewise mentioned, discloses a container, preferably a flat bag, consisting of a transparent plastics film and a magnetic medium contained therein, together with an eutectic mixture having a melting point of from about 0° C. to −50° C. Handling is similar to that in the U.S. Patent, and optically and/or magnetically readable information is generated on the medium. It is also possible for a further strip containing magnetic information to be applied to the bag, said strip being visible after the temperature falls below the storage temperature, so that any information when the permissible storage temperature is exceeded is converted into further information.

The main disadvantage of the abovementioned apparatuses is that, particularly when the permissible storage temperature is only briefly exceeded, it is not certain that the frozen magnetic structure disappears briefly, especially if the container is scarcely moved, if at all, during the temperature change. Another disadvantage found is that the indication is not sufficiently clearly detectable.

It is an object of the present invention to provide an apparatus of the type defined at the outset and a process for monitoring materials with the stated apparatus, which process on the one hand is simple to handle and, on the other hand, even when the permissible storage temperature is exceeded only briefly and is outside the specification and even when the container is not moved, permits an irreversible and forgeryproof indication which persists even when the material to be monitored has been brought back into the range of the permissible storage temperature. It should also be possible to monitor a permissible ambient temperature. Finally, the apparatus should be capable of being produced efficiently as a mass-produced product.

We have found that these objects are achieved, according to the invention, by an apparatus and a process having the features stated in the defining clause of the claims. Further details of the invention are evident from the description and the drawings.

The invention is illustrated below with reference to the figures, in which

FIG. 1 shows a cross-section through a novel container before the start of the treatment FIG. 2 shows the same container after treatment with a magnetic field and after the permissible storage temperature has been exceeded FIG. 3 shows a plan view of an embodiment of a container before the permissible storage temperature has been exceeded FIG. 4 shows a corresponding view after the permissible storage temperature has been exceeded FIG. 5 shows a cross-section through a further embodiment of the novel container FIG. 6 shows a cross-section through the novel container and its position with respect to the material to be monitored FIGS. 7–9 show various plan views of a container in the thawed state, similar to FIG. 4, FIGS. 10–11 show cross-sections through alternative container arrangements to FIG. 5

FIG. 13 shows a cross-section through another novel container similar to FIG. 1

FIG. 13a shows an enlarged section of the container according to FIG. 13

FIG. 14 shows a corresponding cross-section similar to FIG. 2

FIG. 15 shows a cross-section through a modified form of a container similar to FIG. 5

Figure 1:
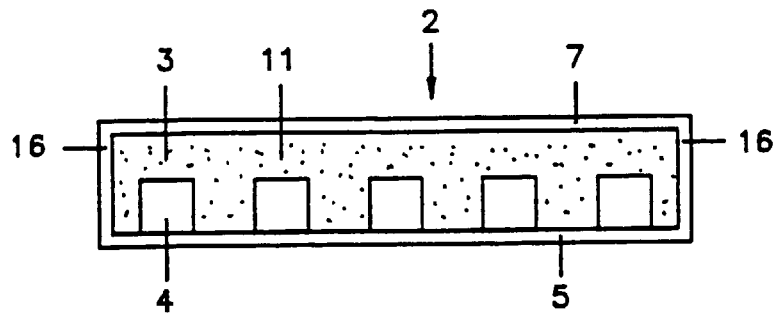

FIG. 1 schematically shows the simplest embodiment according to the present invention. A suspension (3) consisting of a medium which is liquid above the critical storage temperature and, conversely, is solid within the permissible storage temperature range is present in a container (2) having completely or partially transparent inspection surfaces (7, 5). Magnetizable particles which are preferably additionally dispersed in a polymeric organic binder are suspended in this medium. Further suitable additives are mentioned further below. The container (2) also contains, at individual points, at least one solid magnetizable body (4), preferably a plurality of solid magnetizable bodies (4). In the simplest case, this is a magnetizable material which is pressed into a binder, wax or the like, or is pressed or introduced in the form of a powder into pockets or protuberances of the container (cf. FIG. 5) and which is present in a solid or at least very highly viscous state both above and below the critical range of use.

Figure 3:
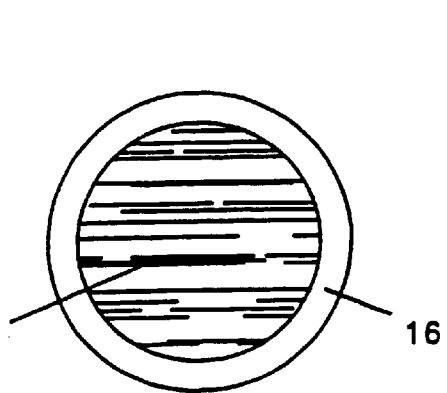

The characteristics of the suspension (3), ie. in particular the packing density of the magnetizable particles (11) in the medium, is chosen so that, after introduction of the suspension (3) and of the solid bodies (4) into the container, from the outside a homogeneous appearance results, which is shown schematically in FIG. 3 and in which the bodies (4) and the inner wall (5), which is adjacent to the frozen material (1) to be tested, are either undetectable or only weakly detectable.

Figure 6:
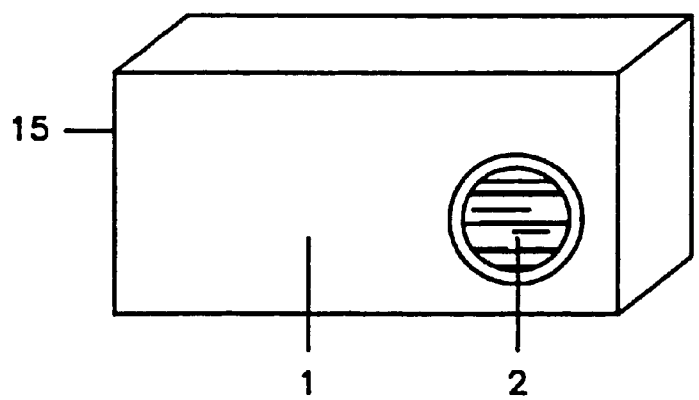

As indicated in FIG. 6, the container (2) is then brought into heat-conducting contact with the medium (1) to be tested, for example a blood plasma or a food pack, for example by virtue of the pack cover of the material to be cooled having an indentation into which the container (2) is firmly inserted or to which said container is adhesively bonded, welded or otherwise connected and is thus visible from the outside at all times.

The container (2) may also be an integral part of the outer wall (15) of the product (1) to be monitored; for example, the outer packaging (15) may be embossed or provided with protuberances or may contain pockets which contain the described indicator function (3, 4) of the container. The container (2) may be designed to be flexible to enable it, if necessary, to be adapted to the shape of the material (1) being monitored, if the two are held together, for example by means of a shrink-film. Its size depends on the requirements set and may have a very wide range of dimensions from the mm to the dm range.

In order to adhesively bond the cover (7) of the container (2) to the base (5) at the edges (16), it is also possible to use a hotmelt adhesive, which simultaneously acts as a housing.

Everything is then cooled below the limit of the maximum permissible storage temperature after which the bodies (4), if necessary also the magnetizable particles of the suspension (3), are magnetized so that they have at least partial, preferably full, residual magnetization, by means of an external magnetic field, as an essential step of the novel process, which is likewise claimed.

The action of the external magnetic field can be achieved by means of a permanent magnet or a current-carrying coil, which is moved past the container (2) in a suitable time so that the magnetization described is produced. The coil may be fed with direct current or with a brief current pulse. The field strength of the magnetic field thus generated should be sufficiently high and may be of the order of magnitude of the coercive force of the magnetizable particles of the bodies (4) and may be, for example, three times this.

Figure 2:
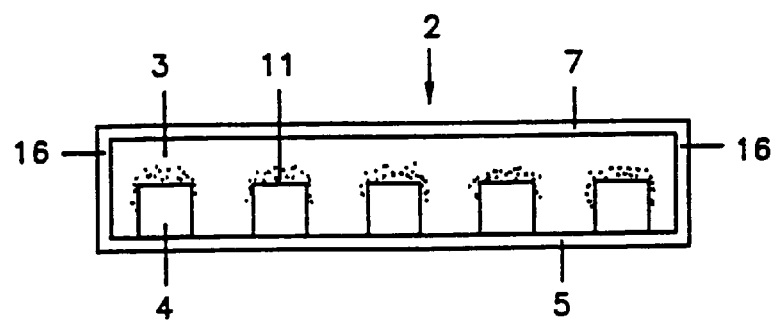
Figure 4:
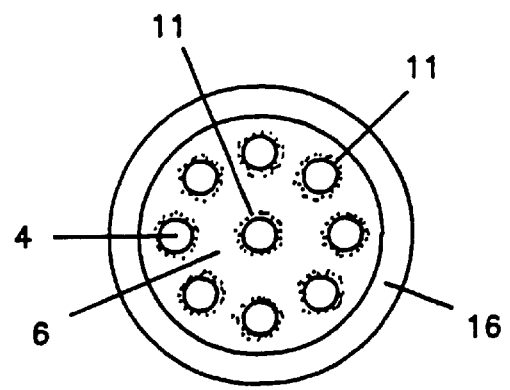

The treatment with the magnetic field has no effect on the outer appearance according to FIG. 3, since the suspension (3) is in fact now in the solid state, ie. the melting point or softening range of the medium of the suspension just corresponds to the storage temperature which is no longer permissible. If said temperature is now exceeded in an impermissible manner for longer than is allowed, the suspension (3) becomes liquid and the magnetizable or magnetic particles (11) contained therein migrate, as shown in FIG. 2, to the solid bodies (4) and are held there so that the plan view of the pack (1, 2) corresponds to the picture shown in FIG. 4. Thus, it is visually clearly evident in a simple manner that the permissible storage temperature was exceeded. Even on refreezing, this structure or the corresponding warning symbol is retained, providing in a very simple manner a reliable irreversible indication that the permissible storage temperature has been temporarily exceeded, and thus completely achieving the main object stipulated at the outset.

There are of course a number of modifications for the present invention, all of which are in the claimed range and in which the fact that the permissible temperature has been temporarily exceeded is indicated in various ways. Some particularly preferred apparatuses are described below.

Figure 5:
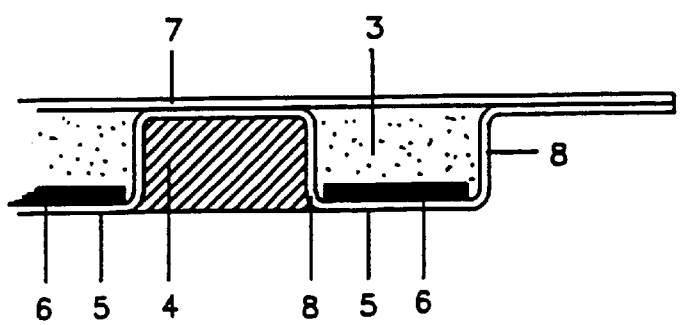

In the embodiment according to FIG. 5, the suspension (3) and the solid bodies (4) are spatially separated from one another. For this purpose, one wall (7) of the container (2) is designed to be flat while the opposite wall (5) is embossed, ie. for example, is equipped with protuberances (8). For example, the magnetizable content (4) is introduced into the raised protuberances while the indented parts of the protuberances contain the suspension (3), or vice versa. In order to improve the visualization of the warning symbol, the inner wall (5) which is directly adjacent to the frozen material (1) is furthermore provided with a reflecting or colored coating (6). This coating may also contain an inscription (FIG. 7) or a geometric pattern (FIGS. 8 and 9). The mode of operation in each case is of course the same as that described with reference to FIGS. 1 and 2 or 3 and 4. The walls (5) and (7) are adhesively bonded or welded to one another. The outer wall (7) is at least partly transparent, while the inner wall (5) with the embossed part (8) may be transparent or opaque. The choice of the material for the walls is discussed further below. The geometric arrangement of the bodies (4) is adapted to the symbols or the text.

Figure 10:
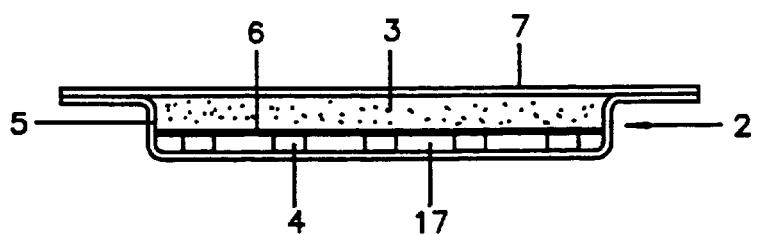
Figure 11:
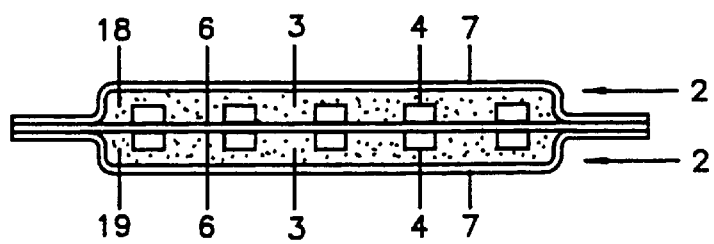

Some variants of the embodiment according to FIG. 5 are also suitable, and two of these are illustrated by way of example in FIGS. 10 and 11. In FIG. 10, the bodies (4) are arranged below the signal surface (6). The signal surface (6) may be perforated, ie. provided with holes, so that, when the medium of the suspension (3) melts, the particles (11)

migrate into the lower part (17) and accumulate there in the usual way on the structure (4).

In FIG. 11, the container is composed of two symmetrical identical or comparable halves (18, 19) having a signal surface (6) as a partition; in this case, the total outer wall (7) is transparent. This container (2) can be united with the packaging (1) in a simple and error-free manner since the upper and lower parts (18, 19) are comparable. The signal surface (6) may also be embossed or provided with protuberances, similarly to FIG. 5.

Figure 12:
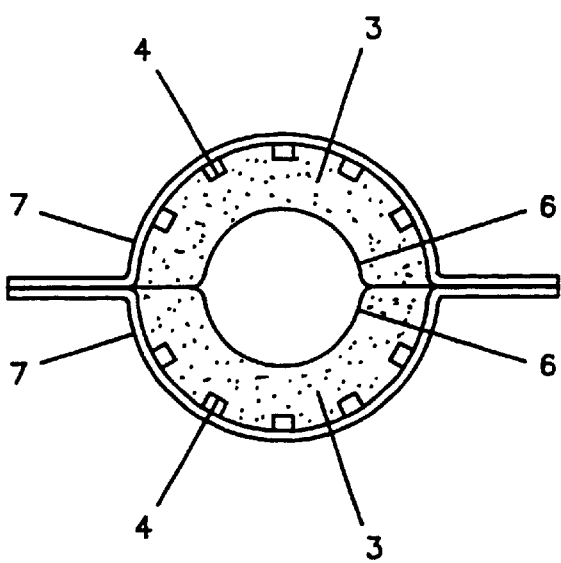
FIG. 12 shows a cross-section through a further embodiment of a novel container

While those embodiments of the container (2) which have been described so far are in the form of capsules or plaques and have either a rectangular (cuboid) or circular shape, the container may also have any other desired shapes, for example the spherical structure shown in FIG. 12 or a cylindrical structure consisting of two cylinder halves. The outer wall (7) is arc-shaped, as is the reflecting or colored layer (6) as an inner wall of the container in which the suspension (3) is present in the usual manner. The fixed magnetic structures (4) may be present either in the outer wall (7), as shown in FIG. 12, or on the inner wall (6) (not shown).

A further embodiment, which is likewise preferred, is evident from FIG. 13. In this, the bodies (4) are adhesively bonded to the inner surface of the transparent outer wall (7) and the suspension (3) is in the interior of the container in the usual manner. Instead of the colored layer or reflecting layer or in addition thereto, a magnetic film (9) to which a magnetic pattern (12) has been applied by suitable prior art means is connected to the inner surface of the inner wall (5). It is also possible for an optically opaque pattern (10) whose dimension is preferably slightly greater than the extension of the body (4) to be situated at those points of the outer wall (7) where the bodies (4) are adhesively bonded to the inner surface of the outer wall (7). This magnetic film or magnetic plate (9) may furthermore only partially cover the base (5) of the container and need not necessarily be flat but may also contain embossing, protuberances or the like.

As is evident from the comparison of FIGS. 13 and 14, the mode of action of this apparatus is as follows. After the suspension (3) and the bodies (4) have been introduced into the interior of the container, the particles (11) preferably collect at those points (12) of the magnetic film (9) with a change of location of the magnetization (cf. FIG. 13a) and are now visible from the outside since they are in fact opposite the transparent parts (20) of the outer wall (7). After the temperature has fallen below the maximum permissible storage temperature, an external magnetic field is applied to the container according to FIG. 13, whereupon the magnetizable particles (11) of the suspension (3) and of the bodies (4) are magnetized so that they have residual magnetization, and at the same time the magnetic pattern (12) incorporated in the magnetic film (9) is destroyed. If the permissible temperature is now exceeded in the case of this container, the magnetic particles migrate to the bodies (4) since the suspension (3) is now fluidized again, so that the appearance shown in FIG. 14 results. In order to clarify the indication, that side of the magnetic film (9) which faces the outer wall (7) may either be colored or be provided with a pattern or with an inscription.

In a variant (not shown) of this arrangement, the particles (11) may also initially collect at a point on the magnetic film which is concealed from the observer and then migrate to visible points after the suspension has thawed and thus form another, visible pattern. In the case of FIG. 13, the medium of the suspension serves merely as a fixing agent for the particles in the frozen state.

Regarding the composition of the container material and its content, aspects regarding compatibility with food and the meeting of disposal requirements are particularly critical. That side (7) of the container which faces the observer should be highly transparent at least in parts, but may be colored, and the outer surface of the wall (7) should advantageously be provided with a treatment which reduces fogging, so that the observer can recognize the state (whether satisfactory or temporarily thawed) after removal of the goods without wiping. The container may consist, for example, of polyethylene terephthalate, of polyolefin, such as polypropylene or polyethylene, or of cellulose acetate or gelatin film. The inner surface of the wall may have been provided with an antistatic treatment and should be readily wettable by the suspension. An adequate breaking strength is of course necessary in the temperature range of use, as is resistance to the suspensions (3) used. The other part facing away from the observer may consist of the same material as the upper part but may also consist of, for example, aluminum-backed paper. It may also be colored instead of having an extra colored layer, a signal color having high luminous power may be advantageous in every case.

The composition of the carrier medium for the magnetizable particles (11) may be as described in the abovementioned publications U.S. Pat. No. 3,675,501 or DE-A 42 10 739. It depends on the temperature of the phase transition. Fats, waxes, oils or eutectic mixtures are suitable depending on the phase transition liquid/solid or softening. Sufficient transparency is important. In addition, prior art surfactants for ensuring ready wetting of the walls and lower alcohols and dispersants for the particles may be added to this medium.

All suitable substances, such as iron oxides, doped or undoped, metal powders or metal alloy powders, chromium dioxide or the like, may be used for the magnetizable particles (11) of the suspension (3). The particles may be embedded in a conventional organic binder or may be present individually or in sintered or granulated form. The particles may also be present in the form of micelles or microcapsules. A two-phase mixture consisting of an aqueous and an oil phase is also suitable for the suspension. The amount by weight of the particles in the suspension may be varied within wide limits and may be used, for example, as a control variable for the time buffer of thawing or of the indication.

The binder for the particles (11) may be colored, for example in an opposite color to the colored layer (6), in order to increase the contrast or to permit a low particle concentration.

The viscosity of the suspension (3) may be set as a regulator and may serve as further time buffer.

Regarding the arrangement of the magnetizable particles, investigations by the applicant have shown that it proves particularly advantageous if said particles are present in small or relatively large agglomerates, preferably in a spherical or plate-like configuration. The size of these particles may be varied within wide limits, from less than 1 $\mu$m up to the mm range. High hiding power in the initial state of the suspension is important in order to achieve a homogeneous structure, for example according to FIG. 3.

Alternatively, the particles (11) may have a plate-like shape and may then consist, for example, of a colored nonmagnetic outer surface and a magnetic inner surface.

The magnetizable material of the bodies (4) may be of the same material as the particles (11). It may be finely dispersed in thermoplastics by solvent-free hotmelt kneading and, if necessary, may be provided with dispersants. It acquires its desired shape on solidification. Depending on the intended use and the embodiment, the bodies may be formed individually or in groups according to the specific function and may be positioned on the inner surface and/or on the outer surface of the upper and lower parts of the container. Their arrangement, size and magnetization in the magnetized state serve to control the time buffer between thawing and indication. In the embodiments according to FIGS. 1 and 2, the bodies (4) must of course be chemically stable to the suspension (3).

The bodies (4) may also have, for example, an annular shape or any other shape. In order for the particles (11) to accumulate in high concentration at preferred points of the bodies (4) in the event of thawing of the suspension, it may be advantageous to magnetize the bodies (4) perpendicularly, ie. in the direction of the observer, in the magnetic field treatment described above. However, horizontal or oblique magnetization may also be carried out.

In a particular embodiment, it may be advantageous if the magnetizable particles or the particle/binder mixture are or is deposited as premagnetized zones in the interior of the container. In these cases, the liquid subsequently to be introduced serves merely for fixing in the frozen state and as a transport medium after thawing. Moreover, in even simpler embodiments, which are not shown in the drawings, the container may contain only the medium and either only the magnetizable particles (11) or only the bodies (4). In the first-mentioned case, the particles (11) must of course be sufficiently magnetized in the magnetic field treatment.

Figure 16:
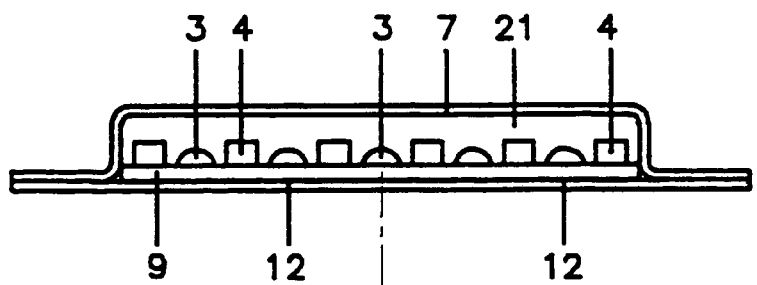
FIG. 16 shows a cross-section through a modified embodiment of a container similar to FIG. 10 before the start of the treatment
Figure 16A:
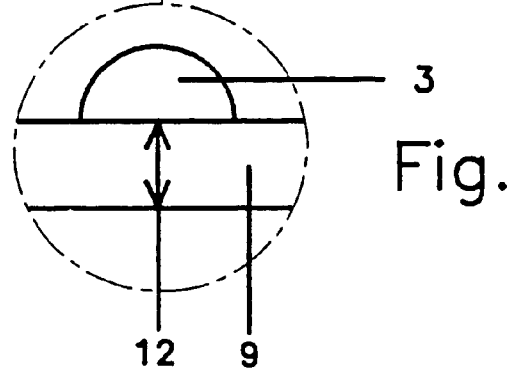
FIG. 16a shows an enlarged section of a container according to FIG. 16
Figure 17:
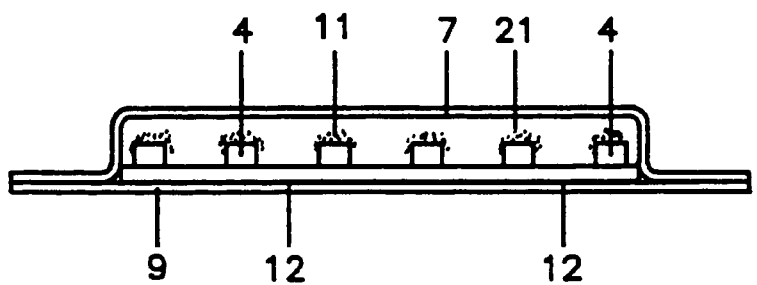
FIG. 17 shows a container according to FIG. 16 after treatment with a magnetic field and after the permissible temperature has been exceeded FIGS. 18a–d schematically show successive steps in the production of containers according to FIGS. 1–17
Figure 18:
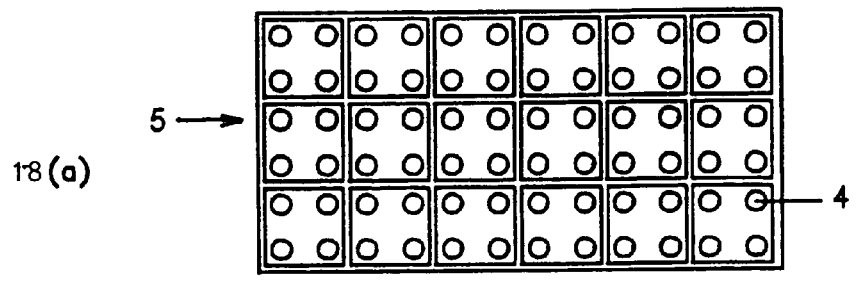
Figure 18:
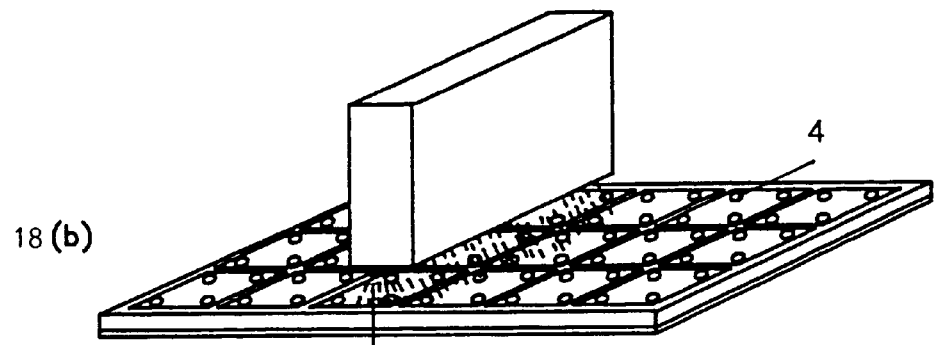
Figure 18:
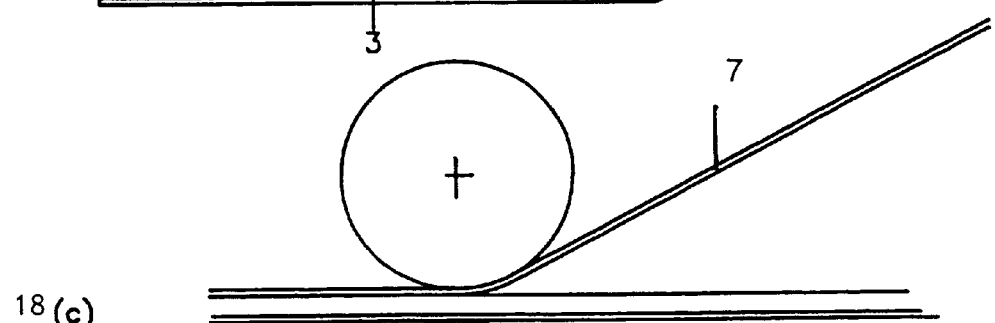
Figure 18:
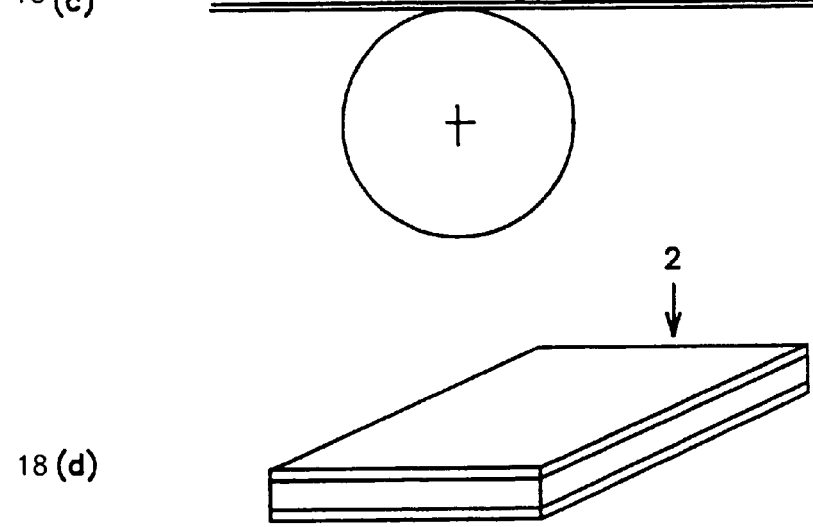

A further variant is shown in FIG. 16, which is a modification of FIG. 13. Here, the total interior (21) of the container is not filled with the suspension as before but is only partly filled, the suspension (3) collecting at the points (12) of changing magnetization of the magnetic plate (9) (FIG. 16a). It is then fixed at these points on freezing. After the magnetic field treatment described and in the case of thawing, the particles migrate in the usual way to the bodies (4). This case is shown in FIG. 17.

In a further variant of FIG. 16, the remaining interior space (21) may also contain a medium which becomes solid on freezing. In this case, the medium of the suspension (3) may remain liquid in the total temperature range.

By means of the novel apparatus, it is also possible in a further variant to avoid a false indication in the case of unintentional brief contact with the temperature indicator but without effective thawing of the frozen material by also providing an outer wall (14) above the wall (7), as shown in FIG. 15, for example water or alcohol or a solid being introduced into the intermediate space (13) and thus being a buffer upstream of the temperature indicator. Similarly, the outer wall (7) may also have a multilayer form in order to keep the heat transfer to the outside low. Moreover, the heat transfer can be controlled by the size and/or thickness of the container (2), and the intermediate space can also be formed between the container and the frozen material (1).

Figure 19:
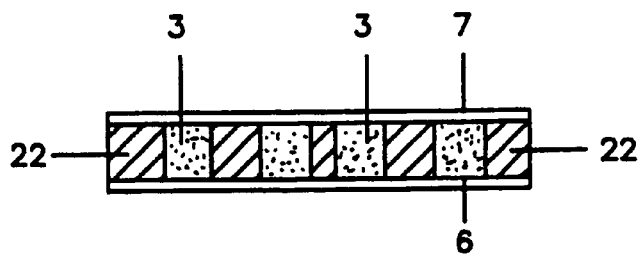
FIG. 19 and FIG. 19b show cross-sections through a modified embodiment of the container respectively before and after treatment and exceeding of the permissible temperature

A somewhat different method according to the present invention is shown in FIG. 19. Here, the container does not contain a plurality of magnetizable bodies (4) but instead a thin magnetizable plate (22) which is provided with holes (23) and consists of the same material and whose size preferably corresponds to the extension of the container (2). The suspension (3) is introduced into the holes (23) and a transparent film (7) is adhesively bonded to the observer's side of the plate and a layer (6) which is colored or reflecting or provided with symbols is adhesively bonded to the opposite side which faces the product to be monitored. In the original state and after deep-freezing and the magnetic field treatment mentioned several times above, the observer recognizes, for example, the homogeneous structure shown in FIG. 3, owing to the natural color of the plate and suspension.

Figure 19A:
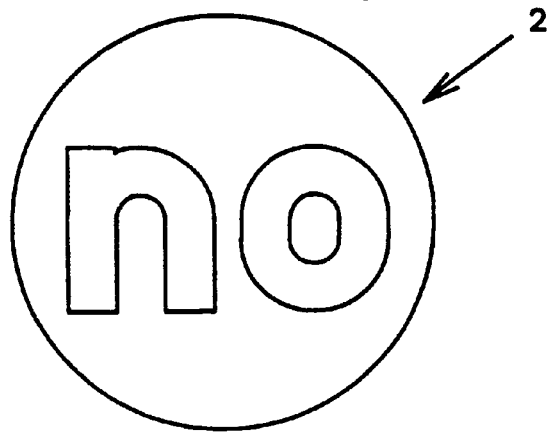
FIG. 19a and FIG. 19c show corresponding plan views of containers according to FIG. 19b after thawing.
Figure 19B:
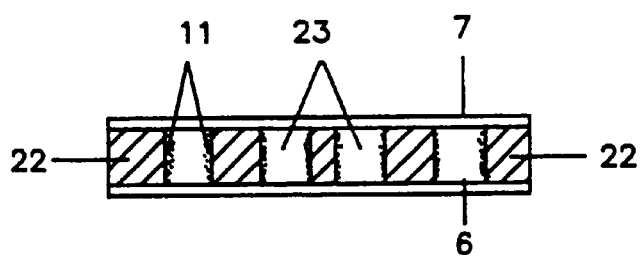
Figure 19C:
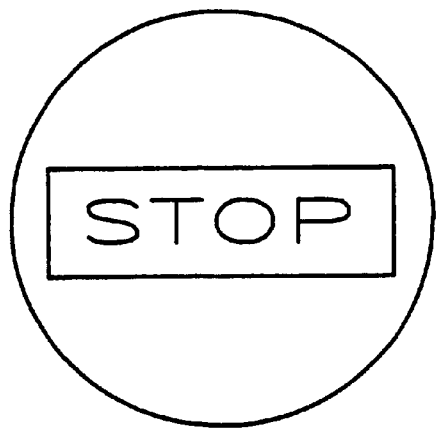

After thawing has occurred, the magnetizable or magnetized particles (11) of the suspension (3) collect (cf. FIG. 19b) at the edges of the holes in the plate (22) so that as a result another symbol, for example as shown in FIG. 19a or 19c, appears to the observer since in fact the previously opaque holes (23) have now become transparent and have thus revealed the signal layer (6).

In FIG. 19a, the designation "no" is punched out as an example of a hole configuration. In FIG. 19c, the rectangular edge and the symbol "Stop" are punched out; of course, many other warning symbols or displays are also suitable. The plate (22) may have a thickness of from about 0.1 mm to several mm.

It is also possible to provide the novel apparatus in a plurality of units, for the following different reasons:

On the one hand, it is possible to use a plurality of units, the suspensions, for example, having solid/liquid transitions at different temperatures, so that it is subsequently possible to determine which temperature has been exceeded or reached. Alternatively, the bodies (4) may have different sizes or magnetization or coercive forces in order to indicate the time for which the temperature has been exceeded.

For safety reasons, it may also be necessary to ensure a heat-conducting connection between a plurality of identical units and the material being monitored or the environment, in order nevertheless to have a functioning indicator in the event of the failure of an individual element caused, for example, by the suspension leaking.

Furthermore, a unit such as one of those described above may additionally be combined with a further unit, the medium thereof being liquid in the total temperature range, ie. even below the maximum permissible temperature. This serves as a detection marker (calibration) for the consumer, enabling the latter to determine whether the magnetic field treatment has indeed been carried out in the case of the temperature indicator.

It may also be necessary to test the novel temperature indicator not optically but by other means, for example a bar code scanner which responds to magnetic influences. The outer wall (7) need not be transparent for this purpose.

Figure 7:
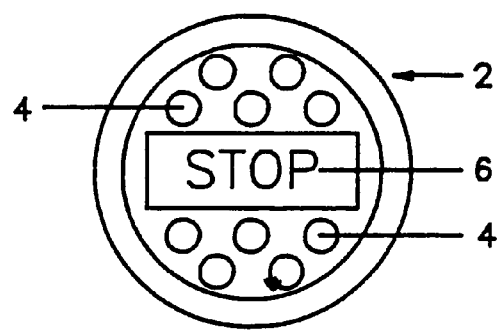
Figure 8:
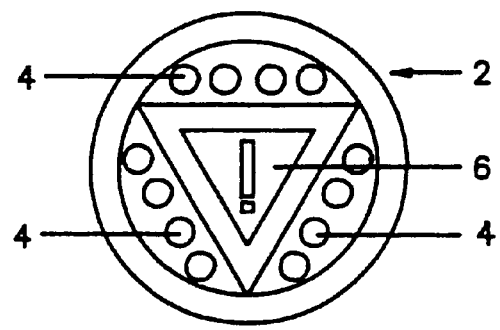
Figure 9:
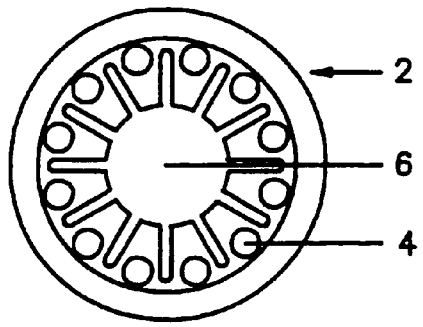

The novel apparatus is very forgeryproof because the pattern, for example as in FIGS. 7–9, is already present optically in a closed space and cannot be made to disappear.

In the case of the apparatus in FIG. 13, the forgeryproof character is based on the fact that the fine pattern (12) can no longer subsequently be written on from the outside.

Finally, a preferred continuous process for the production of the novel temperature indicator is described by way of example with reference to FIGS. 18a–d.

(a) A moving film web serves as a base film (5) and is printed on one side with the desired pattern or provided with a surface coating and embossed and subsequently coated with a hotmelt adhesive in a lattice structure in the embossed areas, the desired geometry of the indicator being appropriately established.

(b) The suspension (3) is filled into the lattice structure on the film web, in succession or simultaneously, and the bodies (4) are injected in a metered manner in the desired shape and geometry. In a variant, the suspension can also be applied so that it overflows or—in the case of high viscosity—can be removed with a doctor blade. The bodies (4) may also be introduced as early as stage a, as shown.

(c) The unit is assembled by uniting the base film containing suspension and solid bodies with the flat cover film (7) between heated rollers and thus adhesively bonding them.

(d) The prepared units (2) are punched out of the composite. In a variant, the units can also be punched out without the cover film and then filled with suspension and/or the materials (4), upon which the previously punched cover film is pressed on in a hot-pressing process.

What is claimed is:

1. An apparatus for the irreversible indication of temporary exceeding of the permissible temperature of products, rooms or the like, comprising a container (2) which has a heat-conducting connection to an object (1) to be monitored and which contains in its interior (21) a suspension (3) comprising a medium which has a melting point or softening range in the range of the monitoring temperature and into which magnetizable particles (11) have been introduced, the container additionally containing, at least at one point, a magnetizable element (4) shaped in the solid state, the container (2) having on its inner surface (5) which faces the object (1) to be monitored, an optically indicating layer (6), detectable from the outside, an outer wall (7) facing the observer being at least partially transparent and, after the suspension (3) has undergone a liquid/solid phase transition, the elements (4) and at least some of the particles (11) of the suspension (3) having the property of residual induction due to the temporary action of an external magnetic field.

2. An apparatus as claimed in claim 1, wherein the optically indicating layer is a two-color layer and/or reflecting and/or provided with symbols.

3. An apparatus as claimed in claim 1, wherein the container (2) has, on its side (5) facing the product (1) to be monitored, a magnetic film (9) having a magnetically applied pattern (12).

4. An apparatus as claimed in claim 3, wherein the outer surface (7) of the container (2) has an opaque pattern (10) on a part of its surface.

5. An apparatus as claimed in claim 4, wherein the opaque pattern (10) covers the elements (4) on the outside.

6. An apparatus as claimed in claim 3, wherein the suspension (3) fills only a part of the interior (21) of the container (2).

7. An apparatus as claimed in claim 6, wherein the remaining part of the interior (21) contains a further medium having a melting point or softening range in the range of the monitoring temperature.

8. An apparatus as claimed in claim 7, wherein the medium of the suspension (3) is liquid in the total monitoring temperature range.

9. An apparatus as claimed in claim 1, wherein either the outer wall (7) or the inner wall (5) of the container has an applied structure (8) in the form of nubs, the projecting and the recessed nubs preferably alternately containing the suspension (3) and the elements (4).

10. An apparatus as claimed in claim 1, wherein the elements (4) below the layer (6) are applied opposite the outer surface (7) facing the observer.

11. An apparatus as claimed in claim 1, wherein the container consists of two mirror-image or comparable halves (18, 19) having the signal surface (6) as a parting surface.

12. An apparatus as claimed in claim 1, wherein the magnetizable element is a thin sheet (22) provided with a plurality of holes (23), suspension (3) being filled into the holes, a transparent film (7) being adhesively bonded to the observer's side of this sheet and a colored, reflecting or symbol-containing layer (6) being adhesively bonded to the side opposite the observer's side.

13. An apparatus as claimed in claim 1, wherein at least one of the walls (5,7) is designed as a heat buffer.

14. An apparatus as claimed in claim 1, wherein the suspension (3) and the elements (4) contain magnetizable particles.

15. An apparatus as claimed in claim 14, wherein the magnetizable particles of the suspension (3) are dispersed in organic binders.

16. An apparatus as claimed in claim 14, wherein the magnetizable particles of the suspension (3) form spherical or lamellar agglomerates.

17. An apparatus as claimed in claim 14, wherein the medium of the suspension (3) consists of fats, waxes, oils, water and/or eutectic mixtures.

18. An apparatus as claimed in claim 14, wherein the suspension (3) is a two-phase system consisting of an aqueous and an oil phase.

19. The apparatus of claim 14, wherein the magnetizable element (4) are fabricated by finely dispersing magnetizable particles in thermoplastics by kneading in the melt in the absence of solvents and bringing into their desired shape on solidification.

20. A process for temperature monitoring using an apparatus as claimed in claim 3, which process comprises applying an external magnetic field to the apparatus so that the magnetizable particles (11) and the magnetizable element (4) are magnetized and the magnetic pattern (12) of the magnetic film (9) is destroyed.

21. A process for temperature monitoring using an apparatus as claimed in claim 1, wherein at least one further container is provided whose medium is liquid in the entire temperature monitoring range and which serves as calibration for the completed magnetic field treatment.

22. The apparatus of claim 1 wherein the container (2) is fabricated by structuring a film web, which is then treated with hotmelt adhesive in the structured areas in a first step, the suspension (3) and the solid materials (4) are introduced into resulting recesses in a second step, a top film is applied and is heat-sealed with a base film in the structured areas in a third step and the individual containers (2) are cut out in the structured areas in a fourth step.

* * * * *